United States Patent
Ijaz et al.

(10) Patent No.: US 11,694,443 B2
(45) Date of Patent: Jul. 4, 2023

(54) AUTOMATIC IDENTIFICATION OF MISLEADING VIDEOS USING A COMPUTER NETWORK

(71) Applicant: KYNDRYL, INC., Armonk, NY (US)

(72) Inventors: Madiha Ijaz, Lahore (PK); Muhammad Ammar Ahmed, Karachi (PK); Sreekrishnan Venkateswaran, Bangalore (IN)

(73) Assignee: KYNDRYL, INC., New York, NY (US)

( * ) Notice: Subject to any disclaimer, the term of this patent is extended or adjusted under 35 U.S.C. 154(b) by 215 days.

(21) Appl. No.: 16/999,099

(22) Filed: Aug. 21, 2020

(65) Prior Publication Data
US 2021/0397845 A1    Dec. 23, 2021

(30) Foreign Application Priority Data
Jun. 22, 2020   (PK) .................................... 409/2020

(51) Int. Cl.
*G06V 20/40* (2022.01)
*G06F 40/30* (2020.01)
(Continued)

(52) U.S. Cl.
CPC ............ *G06V 20/48* (2022.01); *G06F 18/214* (2023.01); *G06F 18/22* (2023.01);
(Continued)

(58) Field of Classification Search
CPC .... G06V 40/172; G06V 20/41; G06V 30/274; G06V 40/168; G06F 40/30; G06K 9/6256; G06K 9/6215; G06K 9/628
See application file for complete search history.

(56) References Cited

U.S. PATENT DOCUMENTS

2018/0189570 A1* 7/2018 Paluri ................. G06K 9/6215
2018/0293278 A1* 10/2018 Kapoor ................. G06Q 50/01
(Continued)

FOREIGN PATENT DOCUMENTS

WO    2019043381    3/2019
WO    2020005571    1/2020

OTHER PUBLICATIONS

Shang et al., "Towards Reliable Online Clickbait Video Detection: A Content-Agnostic Approach", https://arxiv.org/pdf/1907.07604.pdf, ResearchGate, Jul. 19, 2019, 27 pages.
(Continued)

*Primary Examiner* — Margaret G Mastrodonato
(74) *Attorney, Agent, or Firm* — Erik Swanson; Andrew M. Calderon; Calderon Safran & Cole P.C

(57) ABSTRACT

Machine-based video classifying to identify misleading videos by training a model using a video corpus, obtaining a subject video from a content server, generating respective feature vectors of a title, a thumbnail, a description, and a content of the subject video, determining a first semantic similarities between ones of the feature vectors, determining a second semantic similarity between the title of subject video and titles of videos in the misleading video corpus in a same domain as the subject video, determining a third semantic similarity between comments of the subject video and comments of videos in the misleading video corpus in the same domain as the subject video, classifying the subject video using the model and based on the first semantic similarities, the second semantic similarity, and the third semantic similarity, and outputting the classification of the subject video to a user.

20 Claims, 14 Drawing Sheets

(51) Int. Cl.
  G06F 18/22      (2023.01)
  G06F 18/214     (2023.01)
  G06F 18/2431    (2023.01)
  G06V 20/70      (2022.01)
  G06V 30/262     (2022.01)

(52) U.S. Cl.
  CPC .......... *G06F 18/2431* (2023.01); *G06F 40/30* (2020.01); *G06V 20/70* (2022.01); *G06V 20/41* (2022.01); *G06V 30/274* (2022.01)

(56) References Cited

U.S. PATENT DOCUMENTS

| | | | | | |
|---|---|---|---|---|---|
| 2019/0347355 | A1* | 11/2019 | Zhang | ................. | G06K 9/6256 |
| 2020/0099755 | A1* | 3/2020 | Rose | ................. | H04N 21/2668 |
| 2020/0142961 | A1 | 5/2020 | Brake et al. | | |

OTHER PUBLICATIONS

Bajaj et al., "Disinformation in Multimedia Annotation: Misleading Metadata Detection on YouTube", ResearchGate, Oct. 2016, 9 pages.

Zheng et al., "Boost Clickbait Detection Based on User Behavior Analysis", Asia-Pacific Web (APWeb) and Web-Age Information Management (WAIM) Joint Conference on Web and Big Data, Aug. 3, 2017, 7 pages.

Qu et al., "Towards Crowdsourcing Clickbait Labels for YouTube Videos", http://ceur-ws.org/Vol-2173/paper11.pdf, Bauhaus-University Weimar and Leipzig University, downloaded Aug. 10, 2020, 4 pages.

Potthast et al., "The Clickbait Challenge 2017: Towards a Regression Model for Clickbait Strength", https://arxiv.org/pdf/1812.10847.pdf, Cornell Univeristy, downloaded Aug. 10, 2020, 6 pages.

Chen et al., "Web and Big Data", First International Joint Conference, APWeb-WAIM 2017, Jul. 7-9, 2017, 377 pages.

Zheng et al.,"A Convolutional Neural Network for Clickbait Detection", https://ieeexplore.ieee.org/document/8110177, 2017 4th International Conference on Information Science and Control Engineering (ICISCE), Jul. 21-23, 2017, 1 page.

Agrawal, "Clickbait detection using deep learning ", https://ieeexplore.ieee.org/document/8110177, 2016 2nd International Conference on Next Generation Computing Technologies (NGCT), Oct. 14-16, 2016, 1 page.

Anand et al. "We used Neural Networks to Detect Clickbaits: You won't believe what happened Next!", https://arxiv.org/abs/1612.01340, Cornell University, Oct. 17, 2019, 7 page.

Zannettou et al., "The Good, the Bad and the Bait: Detecting and Characterizing Clickbait on YouTube", https://ieeexplore.ieee.org/document/8424634, 2018 IEEE Security and Privacy Workshops (SPW), May 24, 2018, 1 page.

Anonymous, "YouTube-8M: A Large and Diverse Labeled Video Dataset for Video Understanding", https://research.google.com/youtube8m/, accessed Aug. 20, 2020, 4 pages.

Abu-El-Haija et al., "YouTube-8M: A Large-Scale Video Classification Benchmark", https://arxiv.org/pdf/1609.08675.pdf, Sep. 27, 2016, 10 pages.

\* cited by examiner

AUTOMATIC IDENTIFICATION OF MISLEADING VIDEOS USING A COMPUTER NETWORK

BACKGROUND

Aspects of the present invention relate generally to classifying videos in a computer network environment, and more particularly, to machine-based video classifying to identify misleading videos.

A video can have a misleading link if its title is misleading or the thumbnail contains image or text that has nothing to do with the content of the video. Such videos having misleading links can be called clickbait videos, and are increasingly used by content developers on social media platforms to spark their users' natural curiosity and to elicit clicks on the videos or video links.

SUMMARY

In a first aspect of the invention, there is a computer-implemented method including: training, by a computing device, a model using a video corpus; obtaining, by the computing device, a subject video from a content server; generating, by the computing device, respective feature vectors of a title, a thumbnail, a description, and a content of the subject video; determining, by the computing device, first semantic similarities between ones of the feature vectors; determining, by the computing device, a second semantic similarity between the title of subject video and titles of videos in a misleading video corpus in a same domain as the subject video; determining, by the computing device, a third semantic similarity between comments of the subject video and comments of videos in the misleading video corpus in the same domain as the subject video; classifying, by the computing device, the subject video using the model and based on the first semantic similarities, the second semantic similarity, and the third semantic similarity; and outputting, by the computing device, the classification of the subject video to a user.

In another aspect of the invention, there is a computer program product including one or more computer readable storage media having program instructions collectively stored on the one or more computer readable storage media. The program instructions are executable to: obtain a subject video from a content server; generate respective feature vectors of a title, a thumbnail, a description, and a content of the subject video; determine semantic similarities between ones of the feature vectors; classify the subject video based on a weighted sum of the semantic similarities; and output the classification of the subject video to a user.

In another aspect of the invention, there is system including a processor, a computer readable memory, one or more computer readable storage media, and program instructions collectively stored on the one or more computer readable storage media. The program instructions are executable to: obtain a subject video from a content server; generate respective feature vectors of a title, a thumbnail, a description, and a content of the subject video; determine semantic similarities between ones of the feature vectors; classify the subject video based on a weighted sum of the semantic similarities; and output the classification of the subject video to a user.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
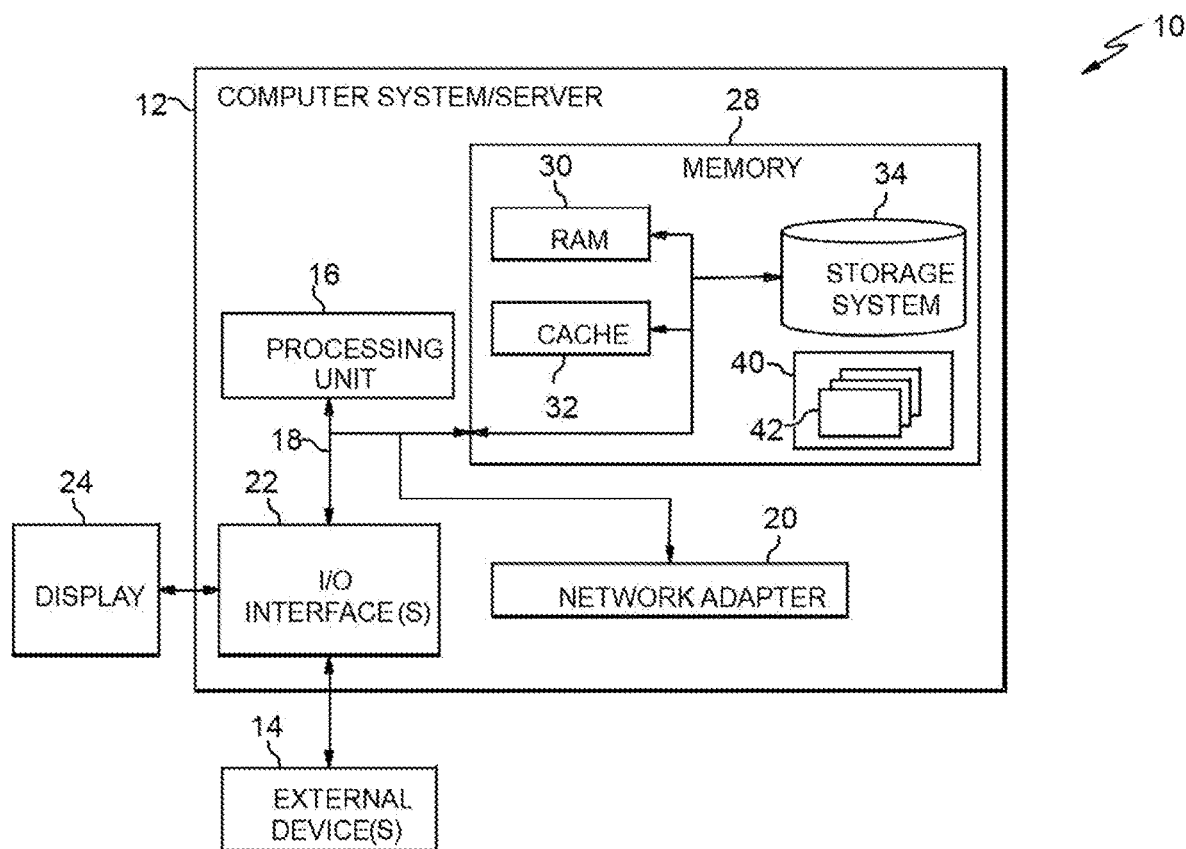
FIG. 1 depicts a cloud computing node according to an embodiment of the present invention.

Aspects of the present invention relate generally to classifying videos in a computer network environment, and more particularly, to machine-based video classifying to identify misleading videos. According to aspects of the invention, a system and method automatically classify videos based on extracting several features from the video environment e.g., (video/audio content, comments, thumbnails, title, and description) and creating a trainable machine learning model to classify the videos as one of misleading, potentially misleading, and non-misleading. Aspects of the invention involve an automated method that searches for dissimilarities and contradictions within various features of the subject video to look for advertent and inadvertent false information. Based on this, the system and method determine a probabilistic score for classifying the subject video as one of misleading, potentially misleading, and non-misleading. Implementations of the invention are usable to classify a video in real time and, thus, alert a user that a video is misleading (e.g., clickbait) before the user clicks on the video. In embodiments, the system and method retrain the predictive model in real time. In this manner, implementations of the invention are useful and have the practical application of automatically alerting users to misleading videos so that the users can avoid clicking on misleading videos.

A video is considered misleading if its title is misleading or its thumbnail contains image or text that has nothing to do with the content of the video. Misleading videos are increasingly used by content developers on social media platforms to spark their users' natural curiosity and to elicit clicks on the videos. As every click helps the content developer in earning revenue, so they come up with innovative ways of tricking users into clicking and watching their content by using misleading and over sensationalizing titles, thumbnails, etc. Social media users, on the other hand, who are tricked into clicking on a video, may experience a sense of disappointment or agitation. Social media platforms have been experiencing growing amounts of misleading videos on their platforms. Automatic detection of misleading videos can help in this regard by tagging a video as possible misleading videos in advance, hence alerting users and discouraging misleading content developers.

One approach to addressing misleading videos is to have human annotators manually identify and tag videos as either misleading or non-misleading. This approach has the disadvantage of requiring a significant amount of human labor and can be time-consuming if the dataset is large.

Another approach to addressing misleading videos is an automated method in which a computer system analyzes the comments associated with a video and determines, based on this analysis of the comments, whether a video is either misleading or non-misleading. This approach has the disadvantage of only working well when there are a number of comments associated with a video. As it takes time for plural users to watch a video and comment on it, this approach cannot be used with videos that are new or relatively new (e.g., recently posted and do not have any or many comments). Also, this approach only analyzes comments and ignores other aspects of a video that might provide insight into the determination. Moreover, this approach does not support real time video classification.

Aspects of the invention address these problems by providing a system and method that use features extracted from pre-click information (i.e., title/heading and thumbnail combined with those extracted from comments, watch time, etc.), and their correlation with actual content of the video and with known misleading videos, to train a model for automatic identification of misleading videos. In embodiments, the features that are extracted and used by the model include at least one selected from the list consisting of: title/heading of a video; thumbnail of the video (including textual data and images shown in the thumbnail); description of the video; the video itself (e.g., audio content of the video, visual content of the video, and textual content of the video); like/dislike ratio of the video; watch time of the video (e.g., average watch time based on plural users watching the video); and user modeling.

It should be understood that, to the extent implementations of the invention collect, store, or employ personal information provided by, or obtained from or about, individuals (for example, comments, likes/dislikes, video watch time, user profile, etc.) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
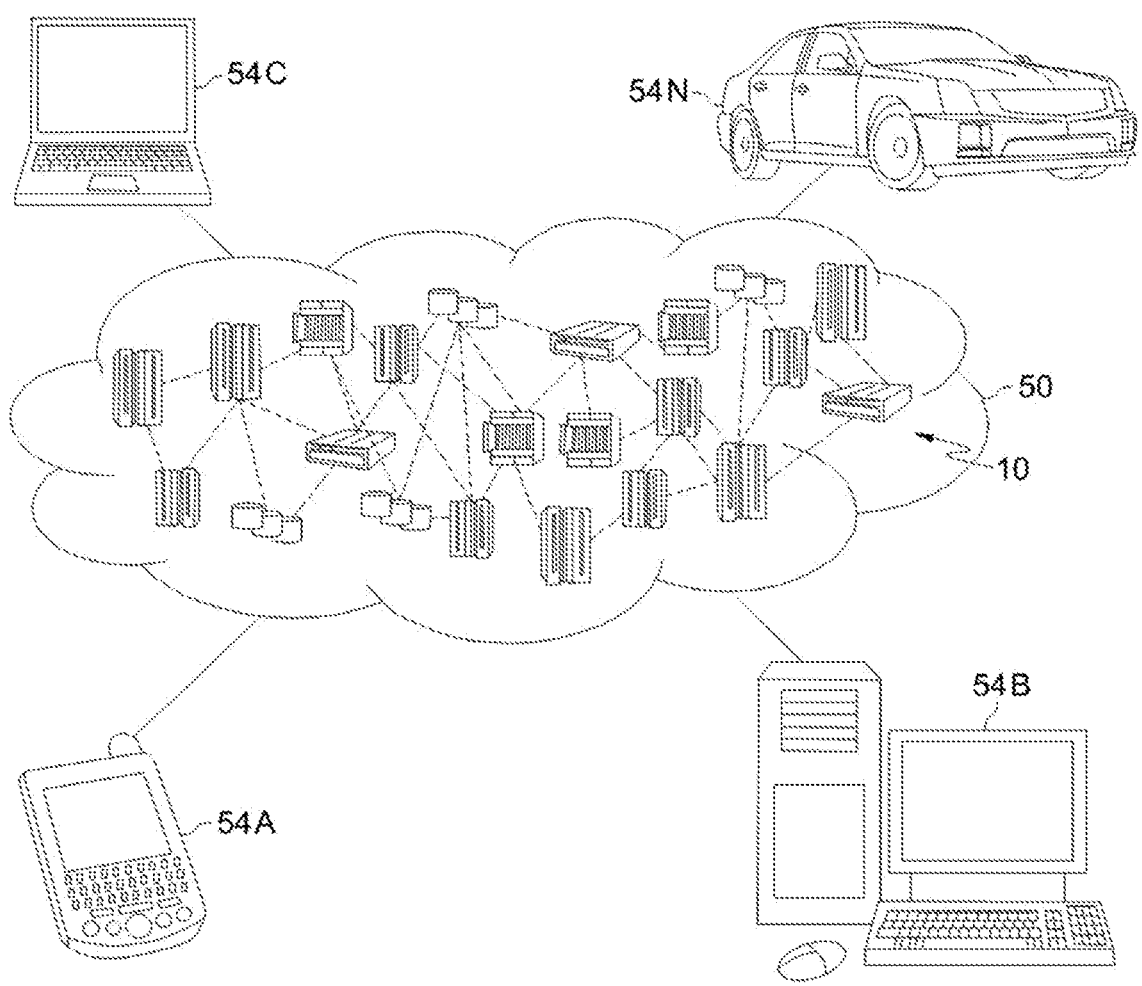
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
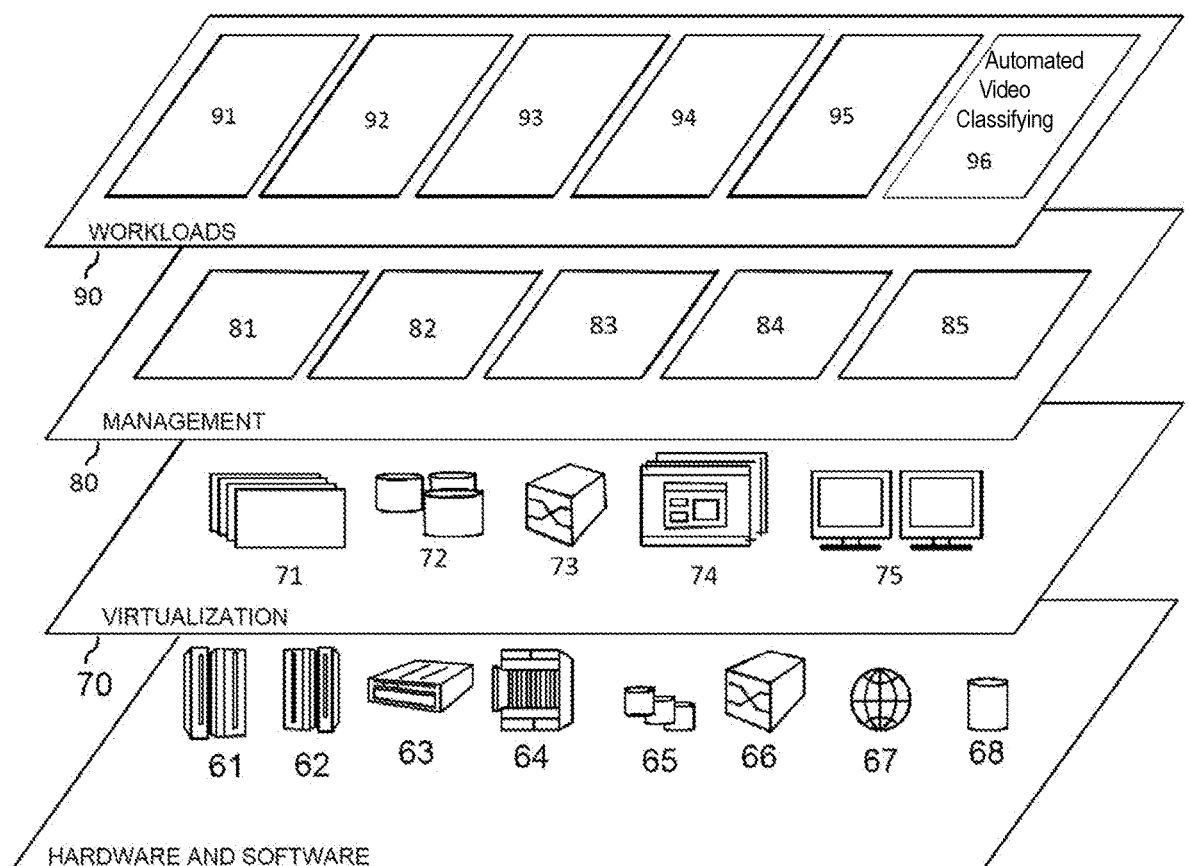
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated video classifying 96.

Implementations of the invention may include a computer system/server 12 of FIG. 1 in which one or more of the program modules 42 are configured to perform (or cause the computer system/server 12 to perform) one of more functions of the automated video classifying 96 of FIG. 3. For example, the one or more of the program modules 42 may be configured to: train a model using a video corpus; obtain a subject video from a content server; generate feature vectors for title, thumbnail, description, and content of the subject video; determine semantic similarly between the feature vectors; determine semantic similarly between the title of subject video and titles of videos in the video corpus in the same domain; determine semantic similarly between comments of the subject video and comments of videos in the video corpus in the same domain; classify the subject video using the model and based on the determined semantic similarities; and output to the classification of the subject video to the user.

Figure 4:
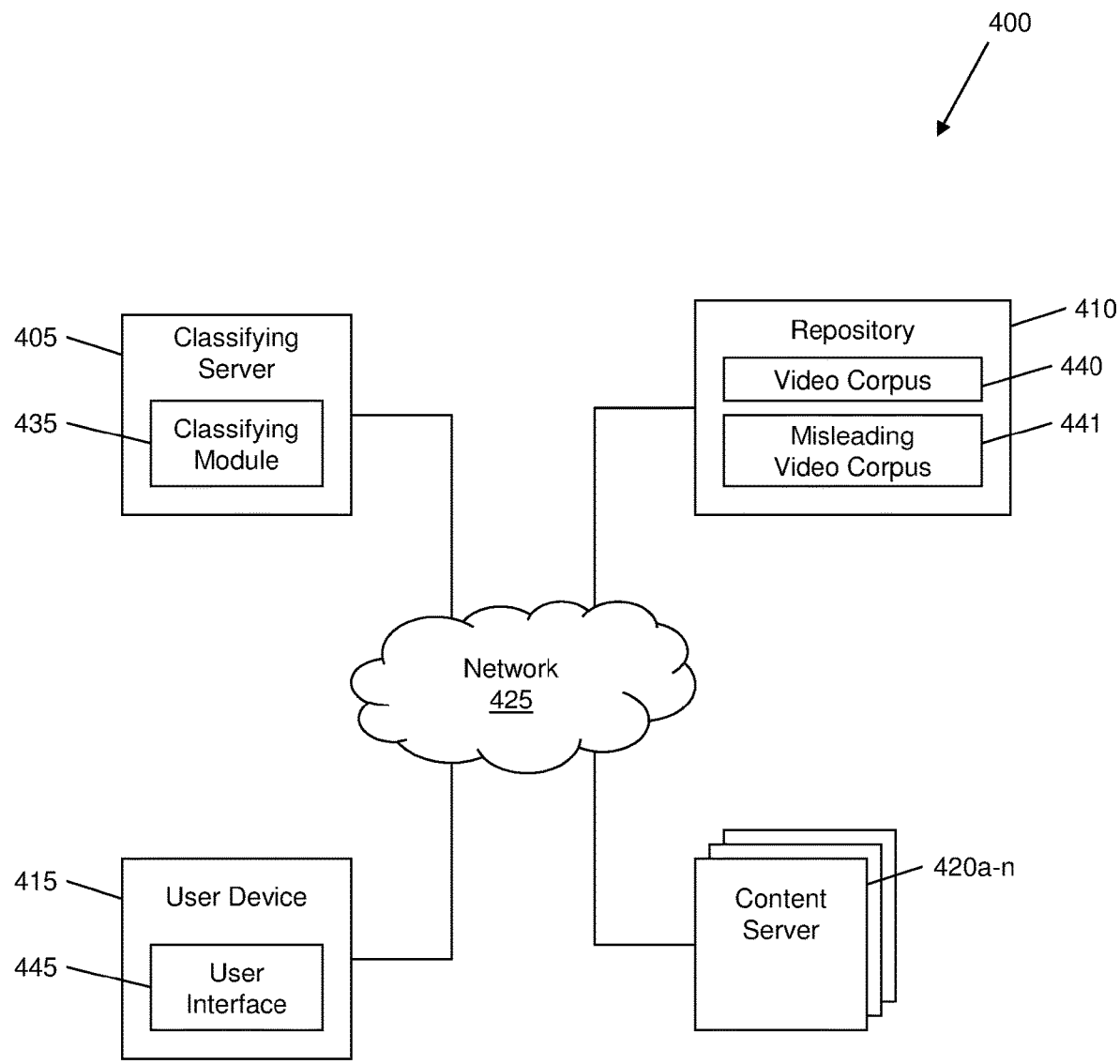
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a classifying server 405, a repository 410, a user device 415, and one or more content servers 420a-n connected to a network 425. The network 425 comprises one or more communication networks, such as one or more of a LAN, WAN, and the Internet. In a cloud implementation, the network 425 corresponds to cloud computing environment 50, the classifying server 405, repository 410, and one or more content servers 420a-n each correspond to one or more cloud computing nodes 10, and the user device 415 corresponds to one of the local computing devices 54A-N.

In embodiments, the classifying server 405 is a computer server such as computer system/server 12 and comprises a classifying module 435 that is configured to perform functions described herein including, but not limited to, classifying videos provided by the content servers 420a-n as one of misleading, potentially misleading, and non-misleading. The classifying module 435 may comprise one or more program modules such as program modules 42 described with respect to FIG. 1. The classifying server 405 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the repository 410 is computer-based data storage (such as one or more instances of system storage 34 of FIG. 1) that is either included in the classifying server 405 or accessed by the classifying server 405 via the network 425. In accordance with aspects of the invention, the repository 410 stores a video corpus 440 that contains a corpus of videos that have been tagged with one or more predefined classes, one or more predefined domains, and one or more predefined audio/visual features. In one particular example, there are 3862 different predefined classes, 24 different predefined domains, and 2.6 billion different audio/visual features, and each of the videos in the video corpus 440 is tagged with one or more of these predefined classes, one or more of these predefined domains, and one or more of these predefined audio/visual features.

Still referring to FIG. 4, in accordance with aspects of the invention the repository 410 also stores a misleading video corpus 441, which is a subset of videos of the video corpus 440 that are tagged as misleading (e.g., clickbait). As such, each video in the misleading video corpus 441 is tagged with one or more of the predefined classes, one or more of the predefined domains, and one or more of the predefined audio/visual features, while also being tagged as known misleading.

In embodiments, and as described herein, the classifying module 435 trains a predictive model using the misleading video corpus 441. In embodiments, the predictive model is a machine learning model such as a convolutional neural network (CNN) and, after training, is used by the classifying module 435 to classify a video provided by one of the by the content servers 420a-n as one of misleading, potentially misleading, and non-misleading.

With continued reference to FIG. 4, the user device 415 is a computer device comprising a user interface 445 that is capable of playing videos provided by one or more of the content servers 420a-n. For example, the user device 415 may comprise a smartphone, tablet computer, laptop computer, desktop computer, etc., and may comprise one or more elements of the computer system/server 12 of FIG. 1.

The content servers 420a-n comprise one or more computer devices that provide content to user devices, such as user device 415, via the network 425. One example of a content server 420a-n is a web server that provides web content to user devices via the network 425. Another example of a content server 420a-n is an application server that provides application content to user devices via the network 425. In both examples, the content provided by the content servers 420a-n may include video content. For example, a webpage or website hosted by a web server might include one or more video thumbnails of videos that a user can select to play via their user interface 445, e.g., by mouse-clicking or finger-tapping on the thumbnail. According to aspects of the invention, the classifying module 435 obtains the video that is the target of a video thumbnail, classifies the video as one of misleading, potentially misleading, and non-misleading, and notifies the user of the determined classification of the video. In embodiments, the classifying module 435 performs this classification in real time, e.g., after the user device 415 has accessed the webpage that includes the video thumbnail and before the user selects the video thumbnail to play the video. In this manner, implementations of the invention alert the user that a video associated with a video thumbnail is misleading (or potentially misleading) before the user clicks on the video thumbnail.

Figure 5:
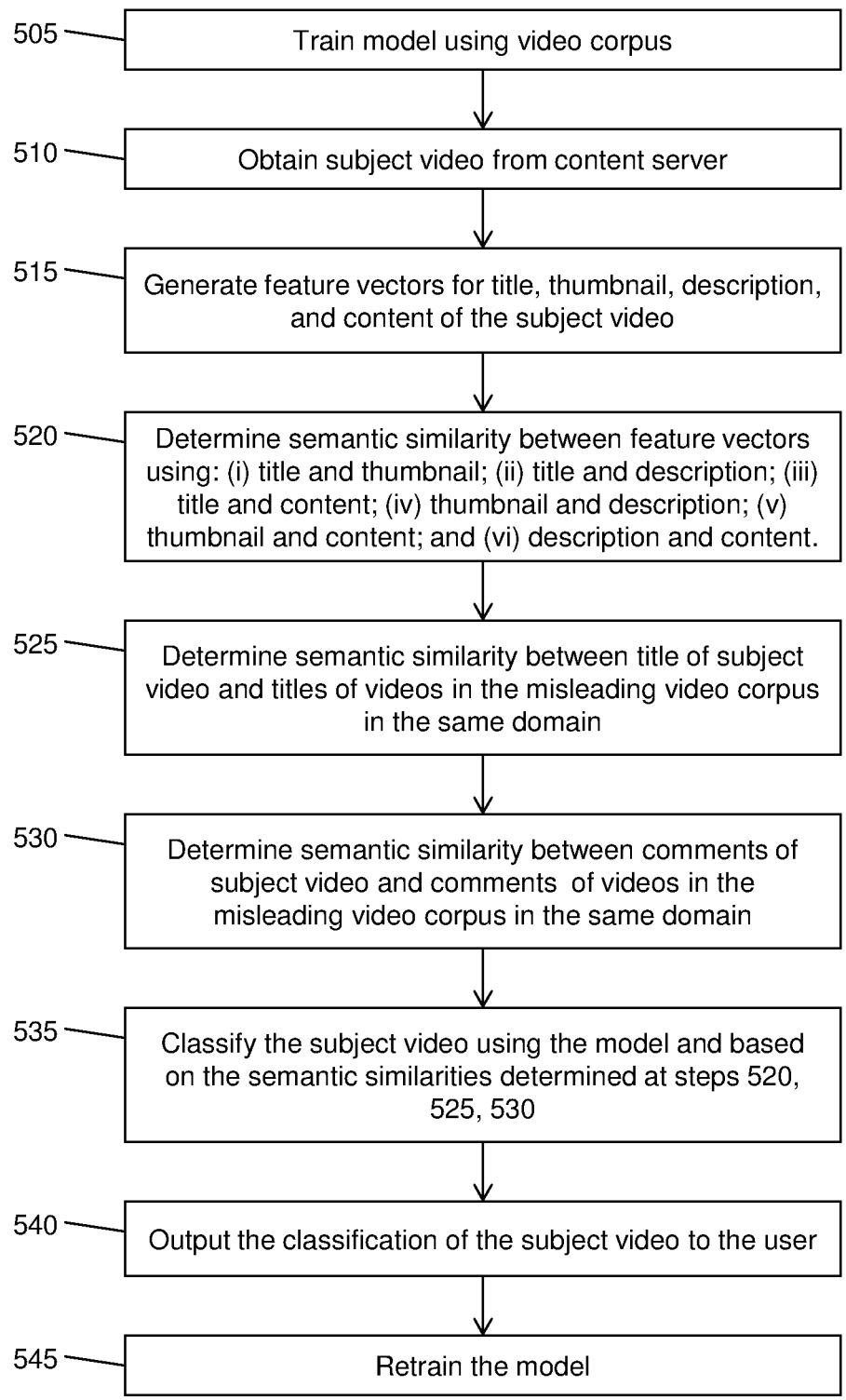
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system trains a model using a video corpus of known misleading videos. In embodiments, the module 435 obtains or accesses the misleading video corpus 441 from the repository 410 and generates a vector space model of titles and a vector space model of comments based on the videos in the misleading video corpus 441. An example of generating a vector space model of titles is provided in the method shown in FIG. 12, and this method may be used at step 505. An example of generating a vector space model of comments is provided in the method shown in FIG. 13, and this method may be used at step 505. As described with respect to FIG. 6, and also shown in FIGS. 12 and 13, step 505 may comprise generating a respective vector space model of titles for each of the domains (e.g., the twenty four predefined domains used to classify the video corpus 440) and a respective vector space model of comments for each of the domains (e.g., the same twenty four predefined domains). In this manner, the system generates a respective vector space model corresponding to titles of the videos in the misleading video corpus 441 in each respective domain, and also a respective vector space model corresponding to comments of the videos in the misleading video corpus 441 in each respective domain.

Still referring to step 505, the system trains the model using the video corpus 440 including the misleading video corpus 441. In embodiments, the module 435 trains a classification model, such as a CNN, on the video corpus 440. For example, the video corpus 440 includes a large number of videos (e.g., 8 million) with a subset of those video that are tagged as misleading (e.g., misleading video corpus 441), and the module 435 uses this knowledge of the known misleading videos and the other metadata (e.g., domain tags and class tags of each video in the corpus) to train the model.

At step 510, the system obtains a subject video from a content server. In embodiments, the module 435 obtains a subject video from one of the content servers 420a-n in response to the user device 415 accessing a website or application that contains a link to the subject video. In embodiments the module 435 obtains the subject video prior to the user device 415 playing the video. In this manner, the system may classify the subject video and alert the user to the classification before the user plays the video.

At step 515, the system generates respective feature vectors corresponding to the title of the subject video, the thumbnail of the subject video, the description of the subject video, and the content of the subject video. The features vectors (V1, V2, V3, V4) may be generated using the methods shown in FIGS. 8-11 and as described herein. In embodiments, each feature vector represents the presence or absence of each of the predefined classes used to classify the videos in the video corpus 440. In one exemplary implementation, there are 3862 predefined classes, and each feature vector of step 515 in this example is a vector that represents the presence or absence of each of the 3862 classes in the subject video (of step 510).

Figure 14:
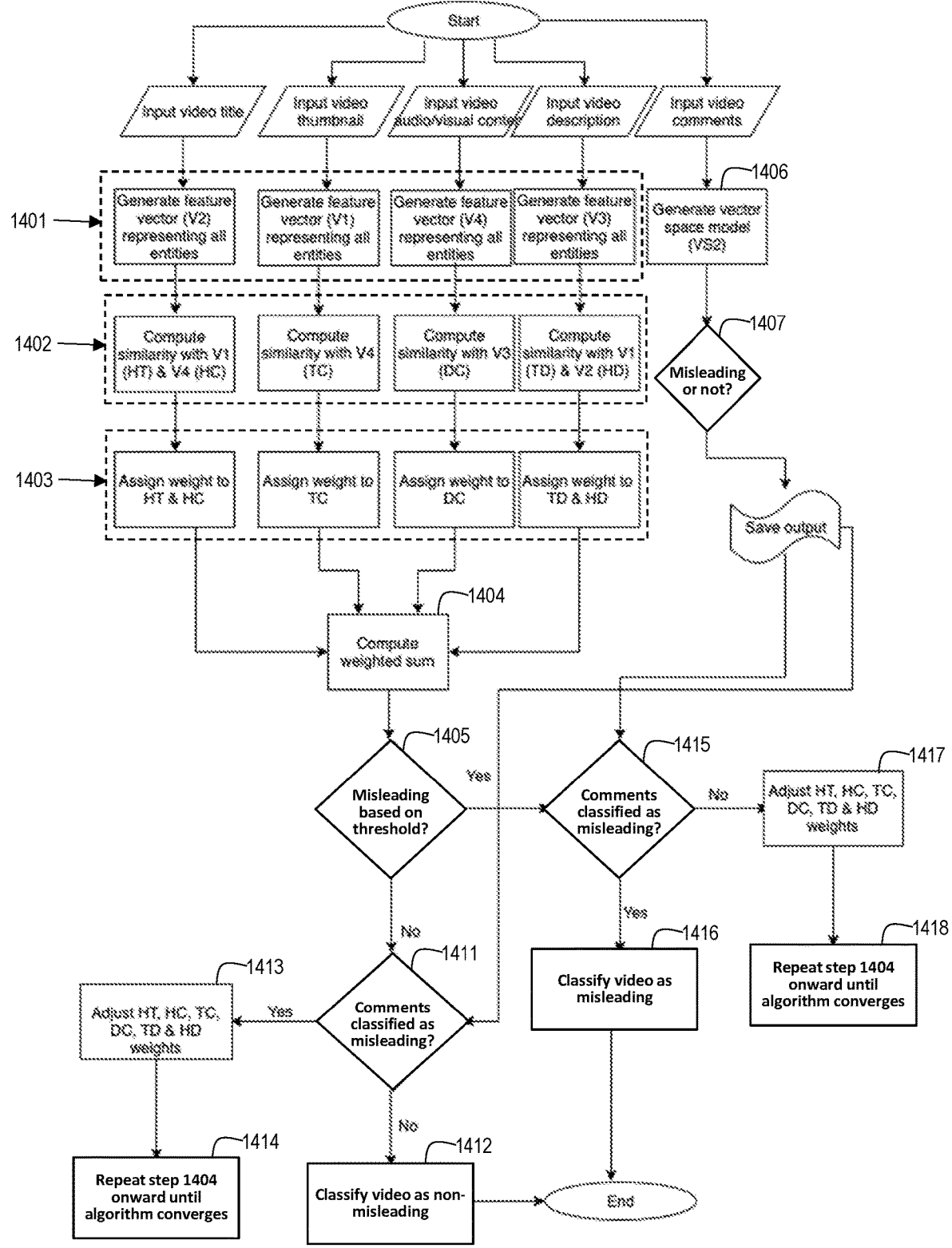
FIG. 14 shows a flowchart of an exemplary method of classifying a subject video in accordance with aspects of the invention.

At step 520, the system determines semantic similarity between the feature vectors determined at step 515. In embodiments, and as shown in FIG. 14, the module determines: (i) a semantic similarity (HT) between the title feature vector (V2) and the thumbnail feature vector (V1); (ii) a semantic similarity (HD) between the title feature vector (V2) and the description feature vector (V3); (iii) a semantic similarity (HC) between the title feature vector (V2) and the content feature vector (V4); (iv) a semantic similarity (TD) between the thumbnail feature vector (V1) and the description feature vector (V3); (v) a semantic similarity (TC) between the thumbnail feature vector (V1) and the content feature vector (V4); and (vi) a semantic similarity (DC) between the description feature vector (V3) and the content feature vector (V4). Semantic similarity is a metric defined over a set of documents or terms, where the idea of distance between items is based on the likeness of their meaning or semantic content as opposed to lexicographical similarity. It is computed using some distance measure, e.g., Euclidean distance, cosine similarity, jaccard coefficient, etc. Cosine similarity, which is a type of semantic similarity, is a metric used to measure how similar the documents are irrespective of their size. Mathematically, it measures the cosine of the angle between two vectors projected in a multi-dimensional space. The module 435 may be programmed to use one or more semantic similarity algorithms, such as Euclidean distance, cosine similarity, etc., in making the determinations at step 520.

With continued reference to step 520, in embodiments the module 435 applies weights to each of HT, HC, TC, DC, TD, and HD. The weights are a relative measure of the respective components on a similarity score. In embodiments, the system adjusts the respective weights based on user feedback. For example, the system may receive user feedback after classifying a subject video, and may use this feedback to adjust the respective weight applied to one or more of HT, HC, TC, DC, TD, and HD.

Figure 6:
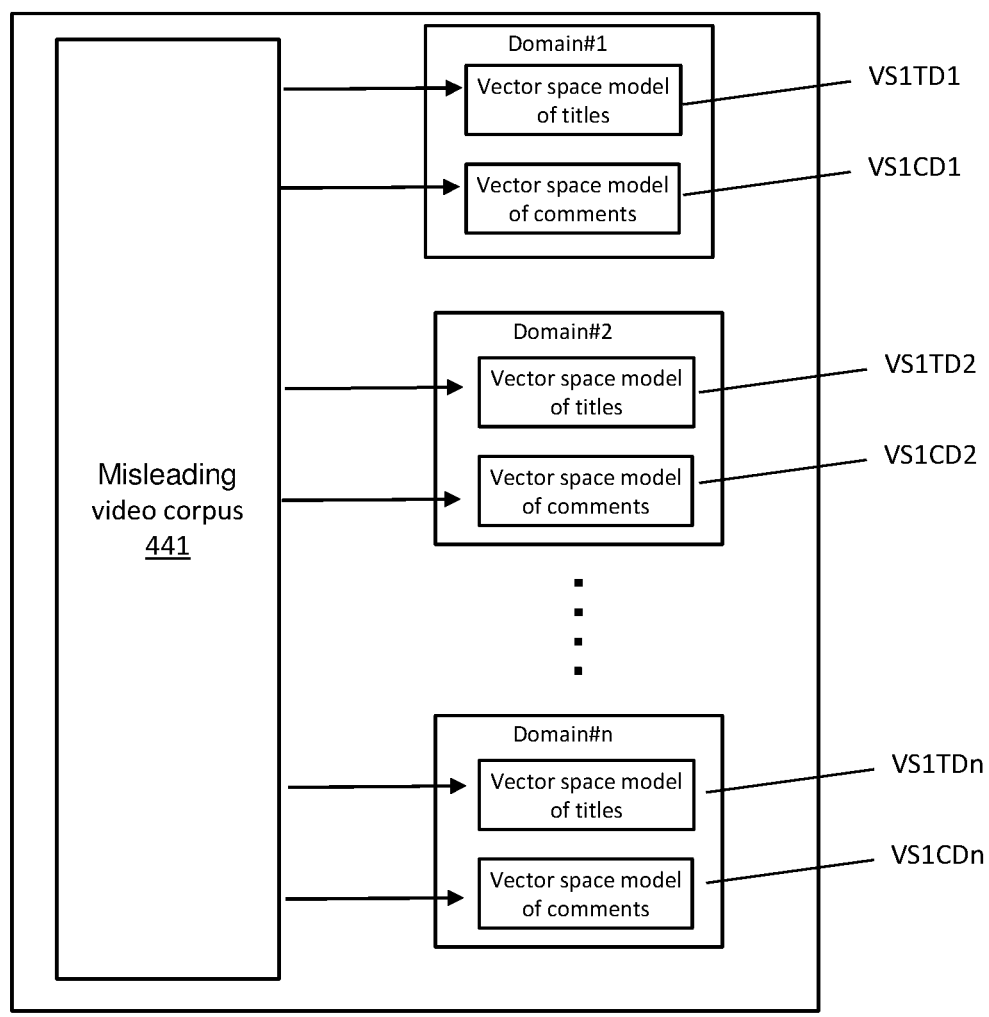
FIG. 6 shows a block diagram that depicts generating vector space models for respective domains in accordance with aspects of the invention.
Figure 12:
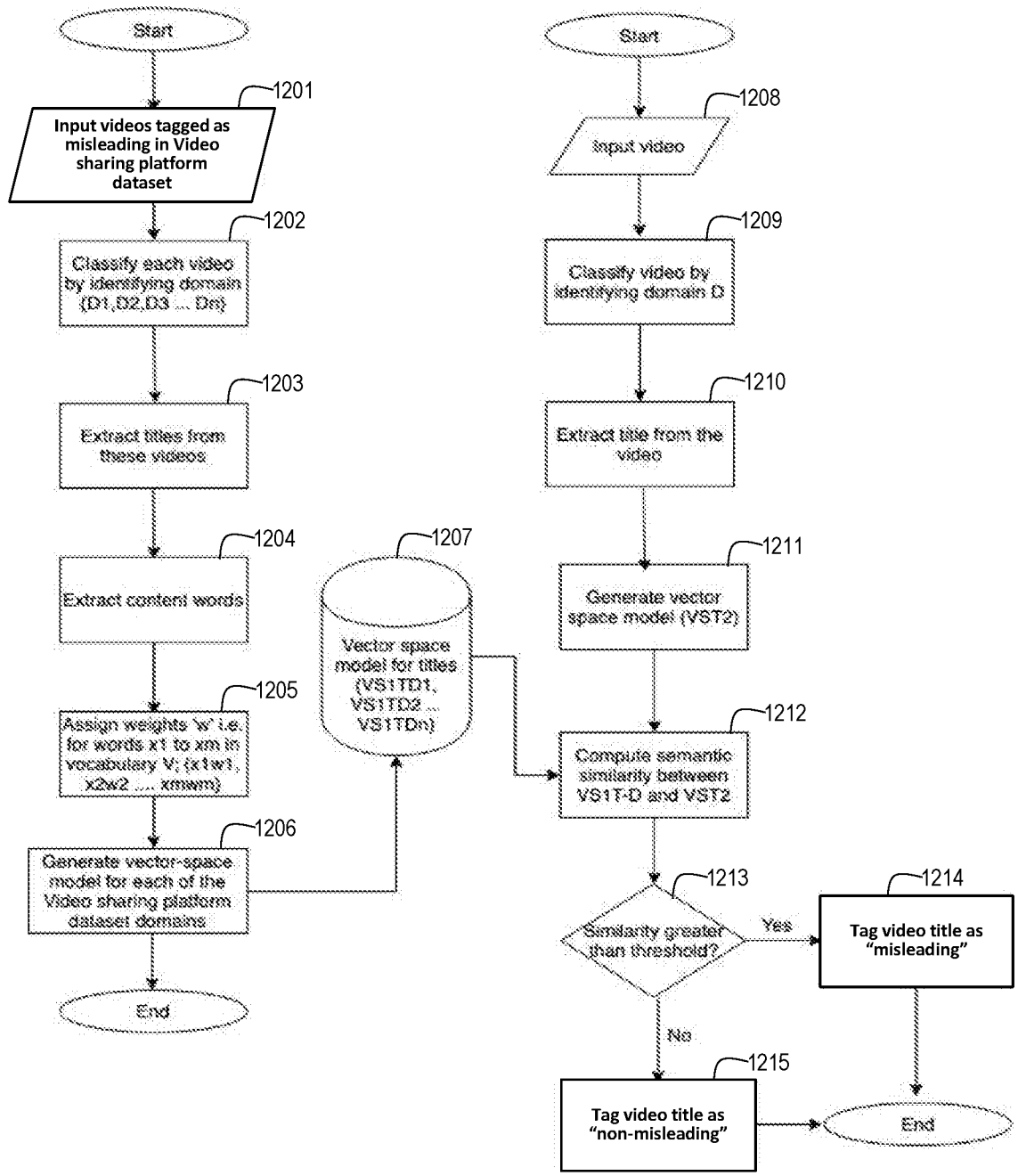
FIG. 12 shows a flowchart of an exemplary method for generating a vector space model of titles in accordance with aspects of the invention.

At step 525, the system determines a semantic similarity between the title of the subject video and titles of videos in the misleading video corpus in the same domain as the subject video. In embodiments, and as shown in FIG. 12, the module 435 classifies the subject video (from step 510) into one of the predefined domains (e.g., one of the twenty four predefined domains from step 505). In embodiments, the module 435 generates a vector space model (VST2) for the title of the subject video and determines a semantic similarity between: (i) the vector space model for the title of the subject video and (ii) the vector space model of titles of the domain in which the subject video is classified (e.g., as shown in FIG. 6). For example, if the subject video is classified in Domain #n, then at step 525 the module 435 determines a semantic similarity between: (i) the vector space model for the title of the subject video (VST2) and (ii) the vector space model of titles of Domain #n (VS1TDn). Similar to step 520, the program module 435 may use one or more semantic similarity algorithms, such as Euclidean distance, cosine similarity, etc., for determining the semantic similarity at step 525.

With continued reference to step 525, in embodiments the module 435 compares the semantic similarity determined at step 525 to a title threshold value. If the semantic similarity determined at step 525 is greater than the title threshold value, then the title is deemed as misleading. If the semantic similarity determined at step 525 is less than the title threshold value, then the title is deemed as non-misleading. In this manner, by utilizing vector space models and semantic similarity, the system deems as misleading the title of the subject video when this title is sufficiently similar to titles of the known misleading videos.

Figure 13:
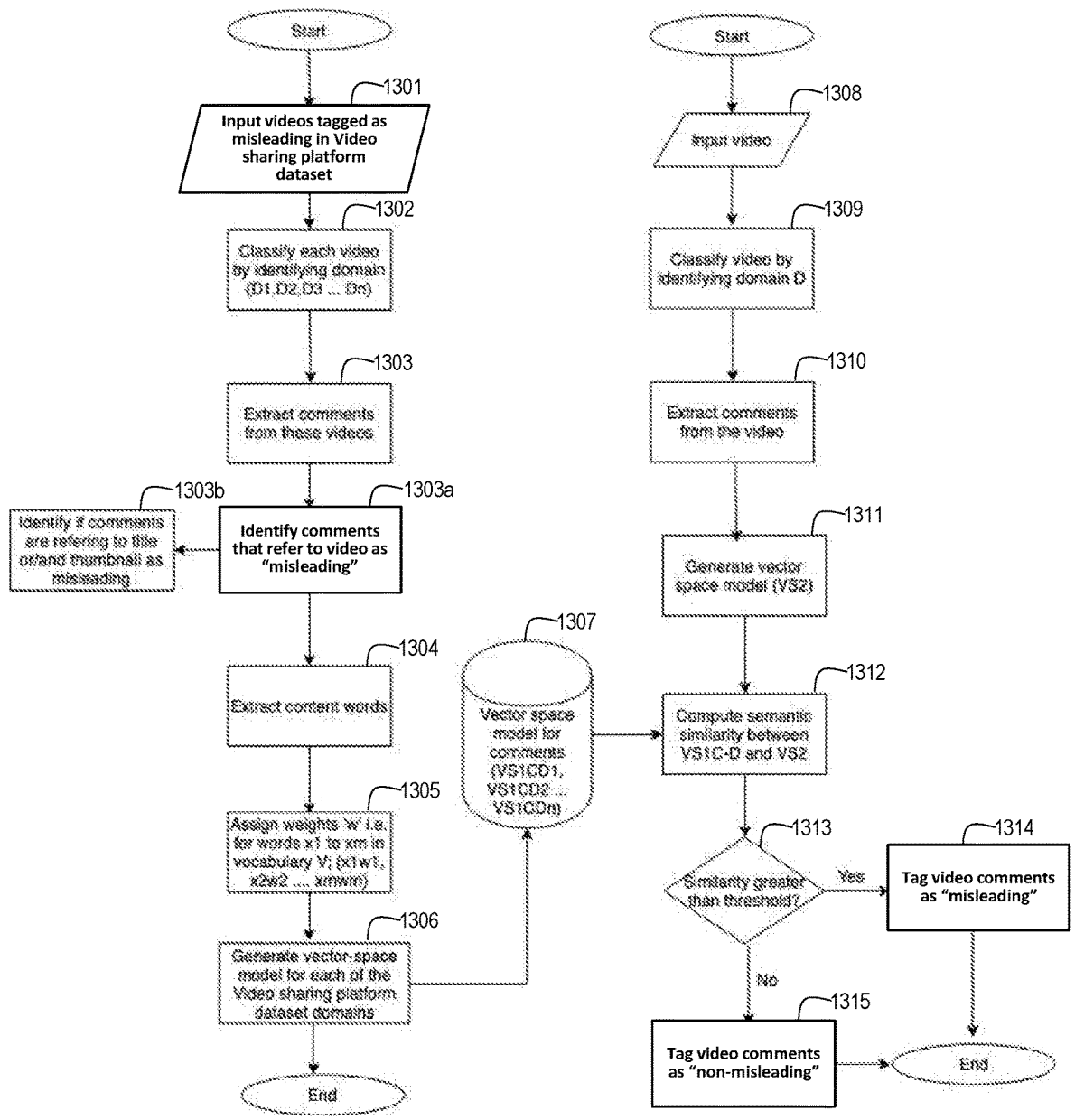
FIG. 13 shows a flowchart of an exemplary method for generating a vector space model of comments in accordance with aspects of the invention.

At step 530, the system determines a semantic similarity between the comments of the subject video and comments of videos in the misleading video corpus in the same domain as the subject video. In embodiments, and as shown in FIG. 13, the module 435 classifies the subject video (from step 510) into one of the predefined domains (e.g., one of the twenty four predefined domains from step 505). In embodiments, the module 435 generates a vector space model (VS2) for the comments of the subject video and determines a semantic similarity between: (i) the vector space model for the comments of the subject video and (ii) the vector space model of comments of the domain in which the subject video is classified (e.g., as shown in FIG. 6). For example, if the subject video is classified in Domain #n, then at step 530 the module 435 determines a semantic similarity between: (i) the vector space model for the comments of the subject video (VS2) and (ii) the vector space model of comments of Domain #n (VS1CDn). Similar to steps 520 and 525, the program module 435 may use one or more semantic similarity algorithms, such as Euclidean distance, cosine similarity, etc., for determining the semantic similarity at step 530.

With continued reference to step 530, in embodiments the module 435 compares the semantic similarity determined at step 530 to a comments threshold value. If the semantic similarity determined at step 530 is greater than the comments threshold value, then the comments are deemed as misleading. If the semantic similarity determined at step 530 is less than the comments threshold value, then the comments are deemed as non-misleading. In this manner, by utilizing vector space models and semantic similarity, the system deems as misleading the comments of the subject video when these comments are sufficiently similar to the comments of the known misleading videos.

Figure 7:
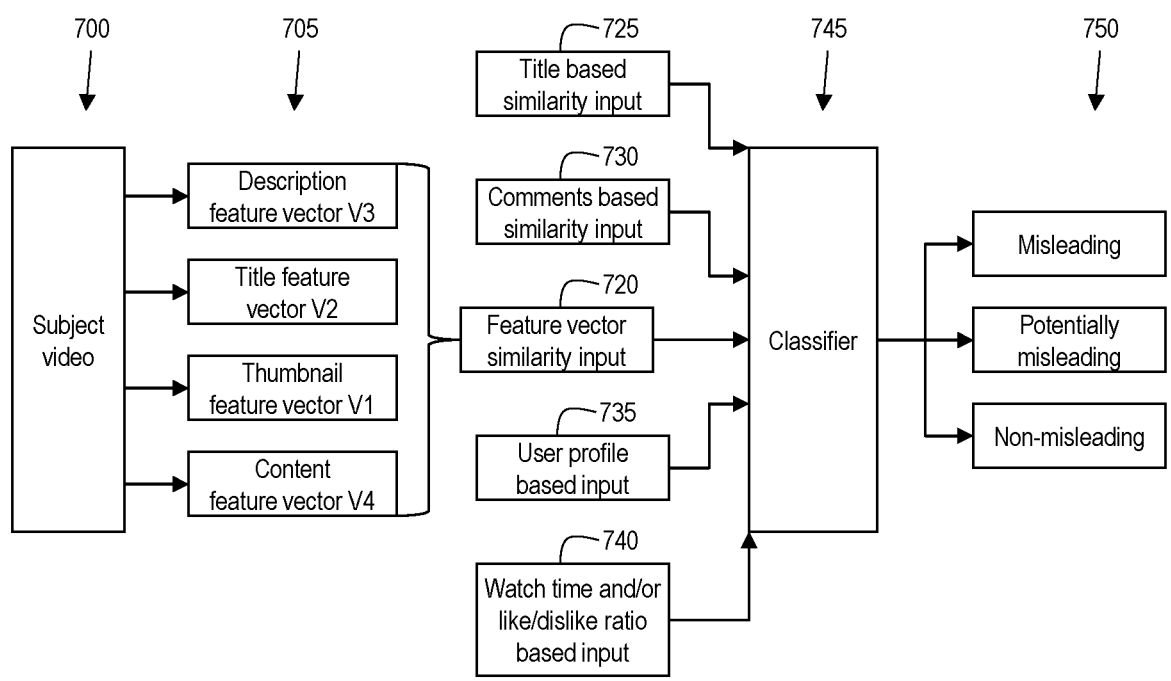
FIG. 7 shows a block diagram that depicts classifying a subject video based on similarity scores in accordance with aspects of the invention

At step 535, the system classifies the subject video (from step 510) based on the semantic similarities determined at steps 520, 525, and 530. In embodiments, and as depicted in FIG. 7, the module 435 performs step 535 using a classifier that receives the semantic similarities determined at steps 520, 525, and 530 as inputs, and that outputs a numeric score based on the inputs. In embodiments, the classifier used at step 535 is the model that was trained at step 505. In embodiments, the numeric score that is output by the classifier is a probabilistic score that represents a measure of dissimilarities and contradictions within various features of the subject video by way of the score being determined based on the semantic similarities of steps 520, 525, and 530. In embodiments, the module 435 compares the determined numeric score to two predefined threshold values. If the numeric score is less than the first threshold value, then the subject video is classified as non-misleading. If the numeric score is greater than the first threshold value and less than the second threshold value, then the subject video is deemed potential misleading. If the numeric score is greater than the second threshold value, then the subject video is classified as misleading. In this manner, the system uses the determined measure of dissimilarities and contradictions to predict whether the subject video is misleading. One exemplary algorithm for performing step 535 is shown at FIG. 14, although other algorithms may be used.

With continued reference to step 535, in embodiments the classifier optionally analyzes user profile of a user that posted the subject video as an additional input that the classifier uses in determining the numeric score that is compared to the first and second threshold values. In embodiments, user profile is a parameter that is based on whether the user that posted the subject video (of step 510) has posted other misleading videos. In one example, the classifier is programmed to utilize the user profile parameter as an input such that a higher number of other misleading videos posted by this same user results in a higher numeric score (e.g., relatively more indicative of the subject video being misleading), and such that a lower number of other misleading videos posted by this same user results in a lower numeric score (e.g., relatively less indicative of the subject video being misleading). In this manner, the classifier may be programmed such that the determined numeric score that is compared to the first and second threshold values is based in part on the user profile.

With continued reference to step 535, in embodiments the classifier optionally analyzes at least one of watch time of the subject video and like/dislike ratio of the subject video as an additional input that the classifier uses in determining the numeric score that is compared to the first and second threshold values. In embodiments, watch time is an average watch time of the subject video (of step 510) by other users that have watched the subject video. In one example, a lower average watch time is more indicative of a video being misleading, and a higher average watch time is less indicative of the video being misleading. In embodiments, like/dislike ratio is the ratio of user likes to user dislikes that are applied to the subject video, e.g., by other users that have watched the subject video. In one example, a lower like/dislike ratio is more indicative of a video being misleading, and a higher like/dislike ratio is less indicative of the video being misleading. In this manner, the classifier may be programmed such that the determined numeric score that is compared to the first and second threshold values is based in part on at least one of the watch time and the like/dislike ratio.

At step 540, the system outputs the determined classification (of step 540) to the user. In embodiments, the module 435 sends data to the user device 415 that causes the user device 415 to display the determined classification via the user interface 445. The display may take any desired form in order to alert the user that the subject video is classified as one of misleading, potentially misleading, and non-misleading.

At step 545, the system retrains the model. In embodiments, the module 435 retrains the model of step 505 using the subject video of step 510 and the determined classification of step 535.

Some implementations of the invention train plural different predictive models that can be used at step 535. A particular embodiment trains four different models as follows. A first model (e.g., Model #1) is based on scores from extracted video features (e.g., title, thumbnail, description, and audio/visual content), comments, and user profile. A second model (e.g., Model #2) is based on scores from extracted video features (e.g., title, thumbnail, description, and audio/visual content) and comments. A third model (e.g., Model #3) is based on scores from extracted video features (e.g., title, thumbnail, description, and audio/visual content) and user profile. A fourth model (e.g., Model #4) is based on scores from extracted video features (e.g., title, thumbnail, description, and audio/visual content).

In embodiments, the module 435 uses a different one of the four models (e.g., Model #1, Model #2, Model #3, Model #4) based on the inputs are available for the subject video (of step 510). In one example, when comments are present and user profile is available, the module 435 uses Model #1. In another example, when comments are present and user profile is not available (e.g., there is no data about whether this same user has posted other misleading videos), the system uses Model #2. In another example, when user profile is available and comments are not present (e.g., such as a newly posted video or a video for which comments are disabled), the module 435 uses Model #3. In another example, when comments are not present and when user profile is not available, the module 435 uses Model #4. In this manner, by having plural models that are each configured to determine the numeric score (used at step 535 to classify the subject video) using different input data, the system uses one of the plural models that is best suited to the available input data.

In further embodiments, the system classifies the subject video using a first one of the plural models based on a first set of input data being available, and then subsequently re-classifies the same subject video using a different one of the plural models based on a second set of input data being available. In one example, the module 435 classifies the subject video at a first time using Model #3 based on there being no comments posted to the subject video (e.g., as is sometimes the case for a newly posted video that has not yet had sufficient time to be commented upon). Then at a second time after the first time, when a number of comments have been posted to the same subject video, the module 435 re-classifies the subject video using Model #1.

In even further embodiments, the system compares the results of the plural models and adjusts weights of parameters used in the models based on the comparison. In embodiments, the module 435 classifies a same subject video (of step 410) using each of the four models (e.g., Model #1, Model #2, Model #3, Model #4) and adjusts weights of parameters used in the models until the outputs of the four models agree. For example, three of the models might classify a particular subject video is misleading, while a fourth one of the models classifies the same subject video as non-misleading. In this example, the module 435 adjusts weights of one or more parameters in one or more of the four models, and re-runs the classification using the adjusted models to see if he four models agree. In this example, the module 435 iteratively performs the adjusting weights and re-running the models until the four models all agree. In embodiments, the weights that are adjusted in this process include one or more of the respective weights applied to HT, HC, TC, DC, TD, and HD.

FIG. 6 shows a block diagram depicting generating vector space models for respective domains in accordance with aspects of the invention. In embodiments, for each of the predefined domains (e.g., Domain #1 . . . Domain #n), the system generates a vector space model of titles and a vector space model of comments for the respective domain. This module 435 may perform this process during step 505 of FIG. 5. For example, as shown in FIG. 6, the module 435 uses the titles of the videos in the misleading video corpus 441 to generate a vector space model of titles (VS1TD1) for a first domain (Domain #1), the titles of the videos in the misleading video corpus 441 to generate a vector space model of titles (VS1TD2) for a second domain (Domain #2), etc. In the specific example in which there are twenty four predefined domains (n=24), the module 435 generates twenty four different vector space model of titles (VS1TD1, VS1TD2, . . . , VS1TDn), i.e., a respective one for each domain. In this same example, the module 435 uses the comments of the videos in the misleading video corpus 441 to generate a same number of vector space models of comments (VS1CD1, VS1CD2, . . . , VS1CDn), i.e., a respective one for each domain. In embodiments, these vector space models (VS1TD1, VS1TD2, . . . , VS1TDn and VS1CD1, VS1CD2, . . . , VS1CDn) are used in the methods shown in FIGS. 12-14 and as described herein.

FIG. 7 shows a block diagram that depicts classifying a subject video based on similarity scores in accordance with aspects of the invention. For example, FIG. 7 depicts: the subject video 700 obtained step 510 of FIG. 5; feature extraction 705 of the title, thumbnail, content, and description of the subject video as performed at step 515; feature vector similarity scores 720 as determined at step 520; title based similarity input 725 as determined at step 525; comment based similarity score input 730 as determined at step 530; user profile based input 735 (as described at step 535); watch time and/or like/dislike ratio based input 740 (as described at step 535); and a classifier 745 that receives the inputs and determines a classification 750 of the subject video 700 based on the inputs.

Figure 8:
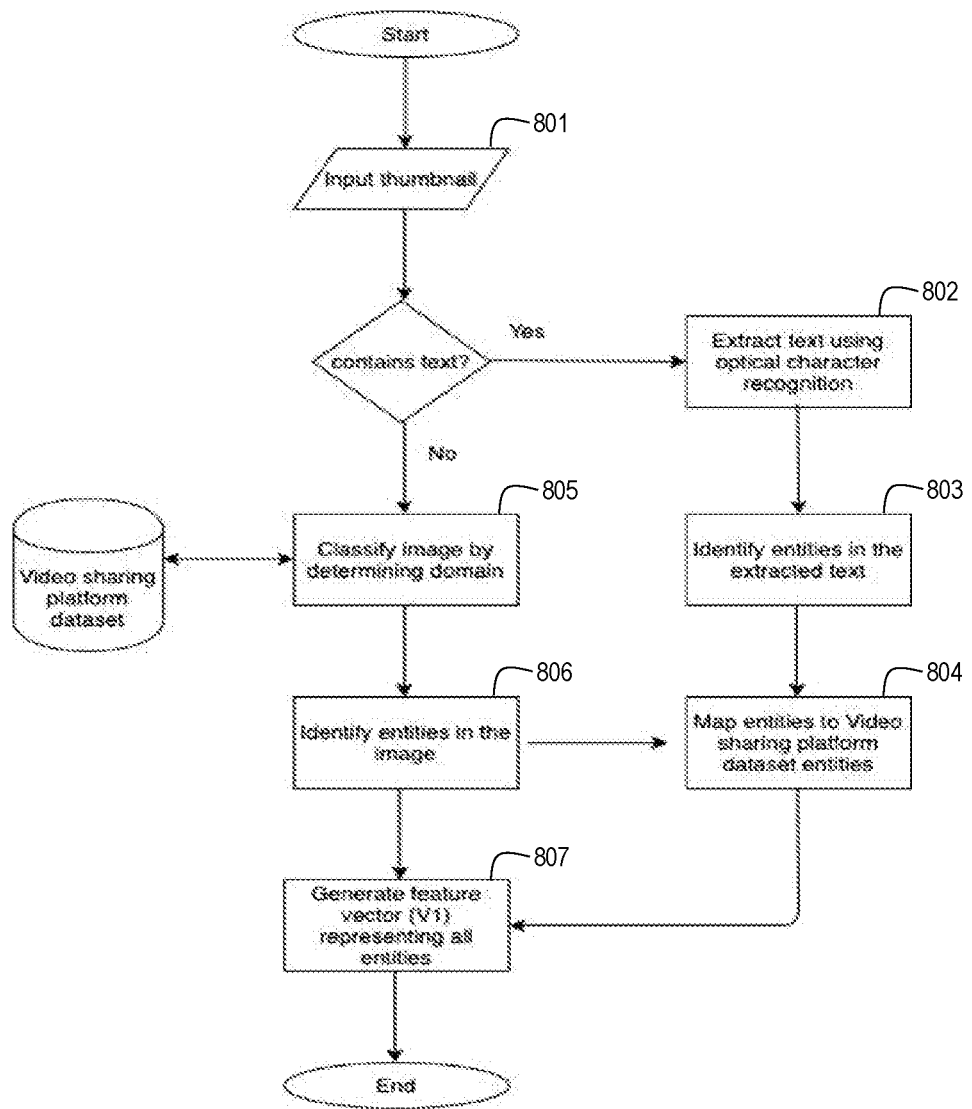
FIG. 8 shows a flowchart of an exemplary method for generating a thumbnail feature vector in accordance with aspects of the invention.

FIG. 8 shows a flowchart of an exemplary method for generating a thumbnail feature vector in accordance with aspects of the invention. In embodiments, the thumbnail feature vector (V1) is a feature vector that represents the presence or absence of each of the predefined number of classes (e.g., 3862 classes in one example) in the thumbnail of the subject video.

At step 801, the system inputs the subject video. In embodiments, step 801 corresponds to step 510 of FIG. 5. If the thumbnail contains text, then the process proceeds down both paths including step 802 and step 805. If the thumbnail does not contain text (e.g., contains only an image), then the process proceeds only to step 805.

At step 802, the system extracts text content from the thumbnail. In embodiments, the module 435 performs step 802 using one or more optical character recognition tools.

At step 803, the system identifies entities in the text extracted from the thumbnail (from step 802). In embodiments, the module 435 performs step 803 using one or more named entity recognition (NER) tools that extract predefined entities from text.

At step 804, the system maps the entities (determined at step 803) to the predefined entities (i.e., classes) associated with the video corpus 440. In embodiments, the module 435 performs the mapping using a predefined mapping scheme. In this manner, the system determines which of the predefined classes (e.g., the 3862 predefined classes in one example) are present and absent in the text of the thumbnail of the subject video.

At step 805, the system classifies an image in the thumbnail in one or more of the predefined domains associated with the video corpus 440 (represented in this figure and other figures by the "Video sharing platform dataset"). In embodiments, the module performs step 805 using one or more classification tools and based on the predefined domains associated with the video corpus 440 (e.g., twenty four predefined domains in one example).

At step 806, the system identifies entities in the image in the thumbnail. In embodiments, the module 435 performs step 806 using classification tools that identify predefined entities in image content. In embodiments, the entities at step 806 correspond to the predefined classes associated with the video corpus (e.g., 3862 predefined classes in one example). In this manner, the system determines which of the predefined classes are present and absent in the image of the thumbnail of the subject video.

At step 807, the system generates a thumbnail feature vector based on the entities (i.e., classes) from steps 804 and/or 806. In embodiments, when there is text in the thumbnail, the module 435 generates the thumbnail feature vector (V1) by combining the results of steps 804 and 806. In embodiments, when there is no text in the thumbnail, the module 435 generates the thumbnail feature vector (V1) based on the results of step 806. In this manner, the thumbnail feature vector (V1) is a feature vector that represents the presence or absence of each of the predefined number of classes (e.g., 3862 classes in one example) in the thumbnail of the subject video.

Figure 9:
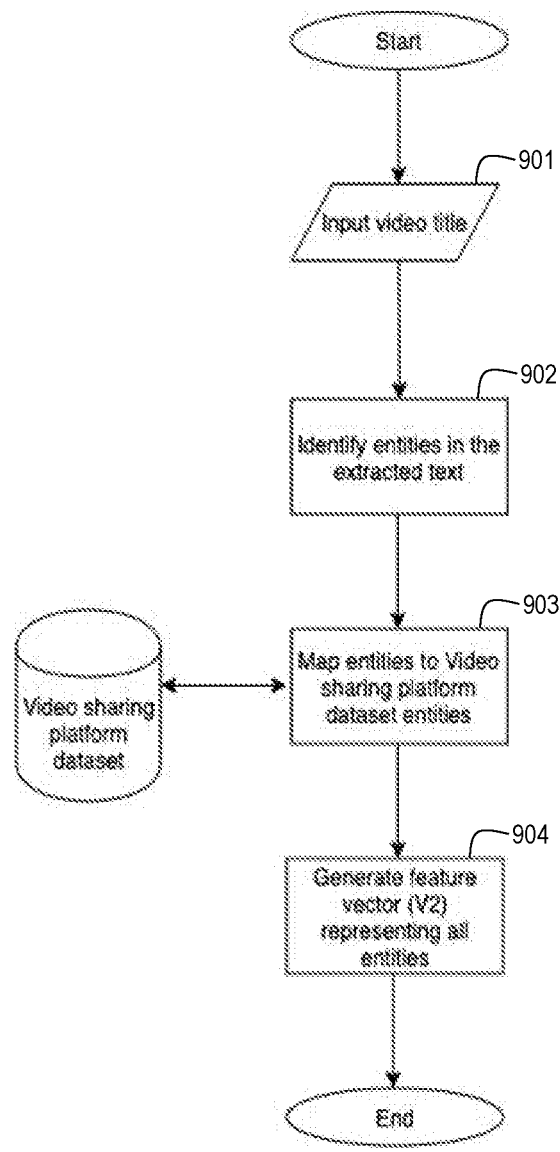
FIG. 9 shows a flowchart of an exemplary method for generating a title feature vector in accordance with aspects of the invention.

FIG. 9 shows a flowchart of an exemplary method for generating a title feature vector in accordance with aspects of the invention. In embodiments, the title feature vector (V2) is a feature vector that represents the presence or absence of each of the predefined number of classes (e.g., 3862 classes in one example) in the title of the subject video.

At step 901, the system inputs the subject video. In embodiments, step 901 corresponds to step 510 of FIG. 5.

At step 902, the system identifies entities in the text of the title of the subject video. In embodiments, the module 435 performs step 902 using one or more named entity recognition (NER) tools that extract predefined entities from text.

At step 903, the system maps the entities (determined at step 902) to the predefined entities (i.e., classes) associated with the video corpus 440. In embodiments, the module 435 performs the mapping using a predefined mapping scheme. In this manner, the system determines which of the predefined classes (e.g., the 3862 predefined classes in one example) are present and absent in the title of the subject video.

At step 904, the system generates the title feature vector based on the entities (i.e., classes) from step 903. In embodiments, the module 435 generates the title feature vector (V2) based on the entities (i.e., classes) from step 903. In this manner, the title feature vector (V2) is a feature vector that represents the presence or absence of each of the predefined number of classes (e.g., 3862 classes in one example) in the title of the subject video.

Figure 10:
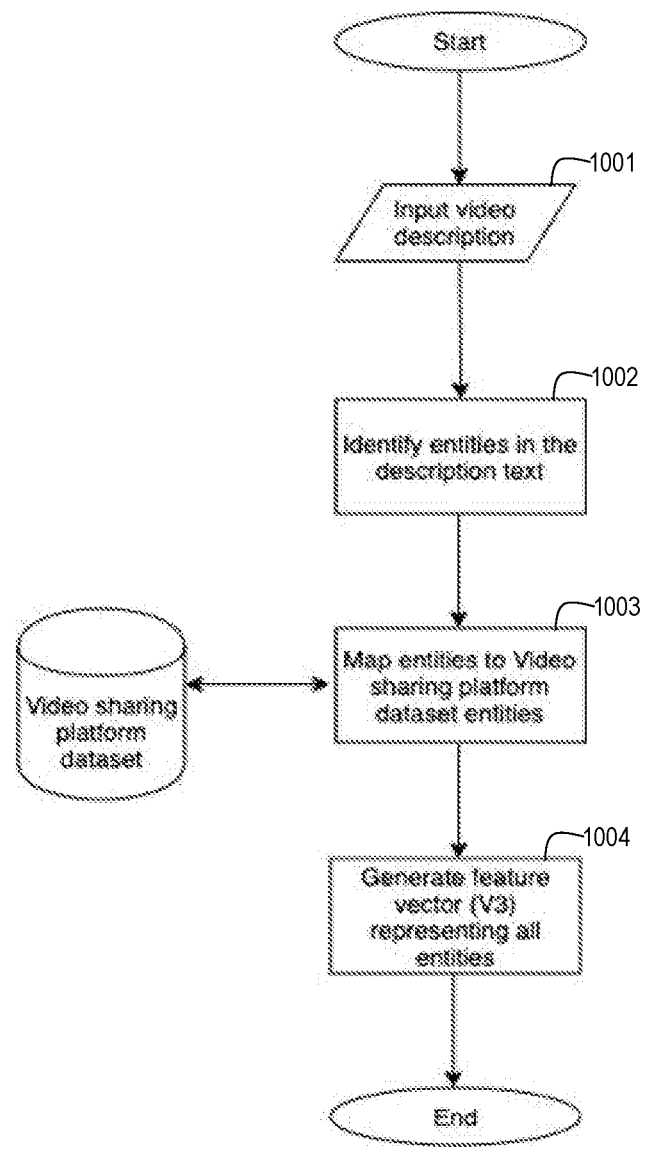
FIG. 10 shows a flowchart of an exemplary method for generating a description feature vector in accordance with aspects of the invention.

FIG. 10 shows a flowchart of an exemplary method for generating a description feature vector in accordance with aspects of the invention. In embodiments, the description feature vector (V3) is a feature vector that represents the presence or absence of each of the predefined number of classes (e.g., 3862 classes in one example) in the description of the subject video.

At step 1001, the system inputs the subject video. In embodiments, step 1001 corresponds to step 510 of FIG. 5.

At step 1002, the system identifies entities in the text of the description of the subject video. In embodiments, the module 435 performs step 1002 using one or more named entity recognition (NER) tools that extract predefined entities from text.

At step 1003, the system maps the entities (determined at step 1002) to the predefined entities (i.e., classes) associated with the video corpus 440. In embodiments, the module 435 performs the mapping using a predefined mapping scheme. In this manner, the system determines which of the predefined classes (e.g., the 3862 predefined classes in one example) are present and absent in the description of the subject video.

At step 1004, the system generates the description feature vector based on the entities (i.e., classes) from step 1003. In embodiments, the module 435 generates the description feature vector (V3) based on the entities (i.e., classes) from step 1003. In this manner, the description feature vector (V3) is a feature vector that represents the presence or absence of each of the predefined number of classes (e.g., 3862 classes in one example) in the description of the subject video.

Figure 11:
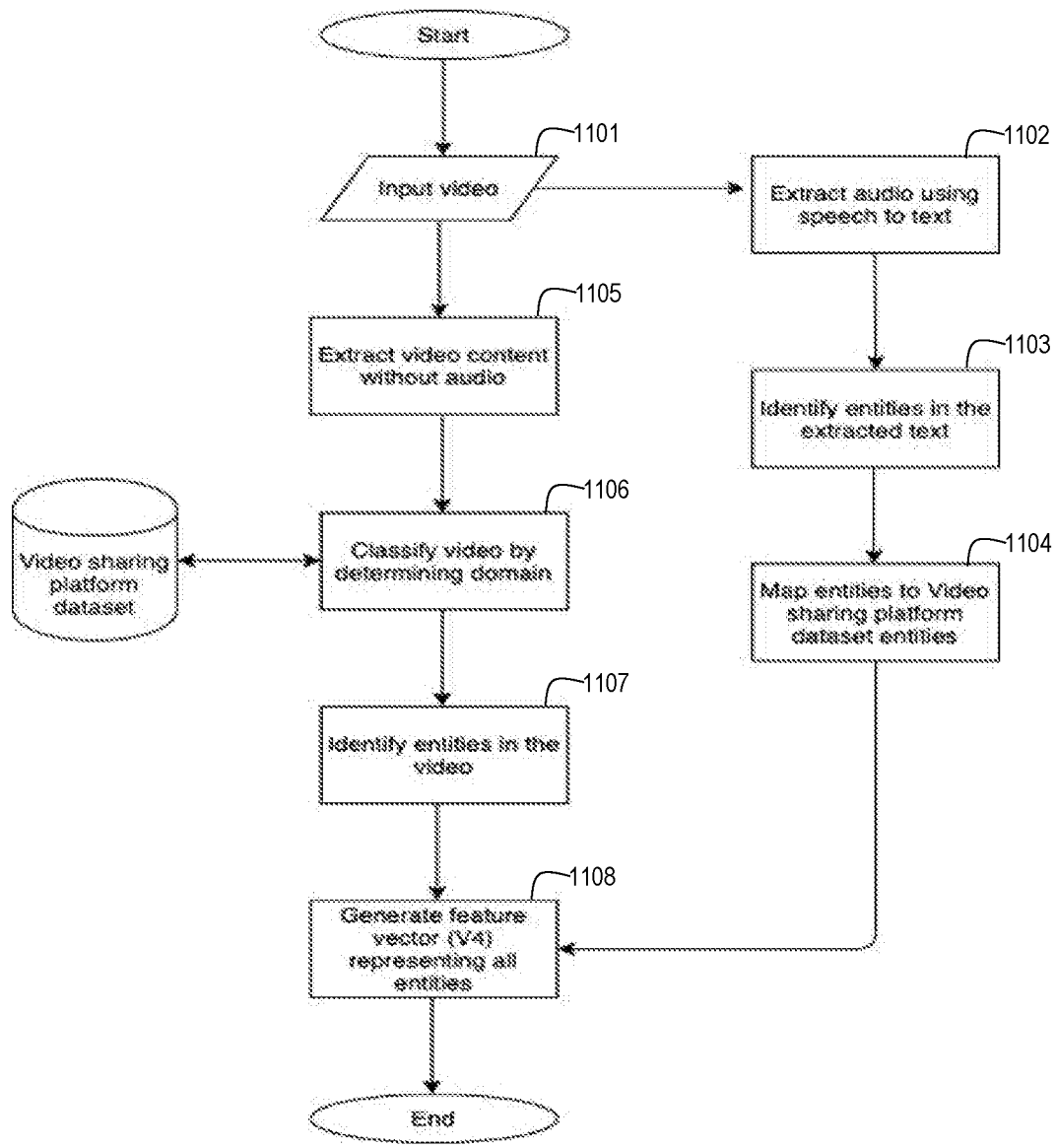
FIG. 11 shows a flowchart of an exemplary method for generating a content feature vector in accordance with aspects of the invention.

FIG. 11 shows a flowchart of an exemplary method for generating a content feature vector in accordance with aspects of the invention. In embodiments, the content feature vector (V4) is a feature vector that represents the presence or absence of each of the predefined number of classes (e.g., 3862 classes in one example) in the audio and/or video content of the subject video.

At step 1101, the system inputs the subject video. In embodiments, step 1101 corresponds to step 510 of FIG. 5.

At step 1102, the system extracts audio content from the subject video. In embodiments, the module 435 performs step 1102 using one or more speech to text tools.

At step 1103, the system identifies entities in the text of the extracted audio content (from step 1102). In embodiments, the module 435 performs step 1103 using one or more named entity recognition (NER) tools that extract predefined entities from text.

At step 1104, the system maps the entities (determined at step 1103) to the predefined entities (i.e., classes) associated with the video corpus 440. In embodiments, the module 435 performs the mapping using a predefined mapping scheme.

In this manner, the system determines which of the predefined classes (e.g., the 3862 predefined classes in one example) are present and absent in the audio content of the subject video.

At step 1105, the system extracts the video content of the subject video without the audio content. In embodiments, the module 435 performs step 1105 using one or more video processing tools.

At step 1106, the system classifies the video into one or more of the predefined domains associated with the video corpus 440. In embodiments, the module 435 performs step 1106 using one or more classification tools and based on the predefined domains associated with the video corpus 440 (e.g., twenty four predefined domains in one example).

At step 1107, the system identifies entities in the video content (from step 1105). In embodiments, the module 435 performs step 1103 using classification tools that identify predefined entities in video content. In embodiments, the entities at step 1107 correspond to the predefined classes associated with the video corpus (e.g., 3862 predefined classes in one example). In this manner, the system determines which of the predefined classes are present and absent in the video content of the subject video.

At step 1108, the system generates feature vector based on the entities (i.e., classes) from steps 1104 and 1107. In embodiments, the module 435 generates the content feature vector (V4) by combining the results of steps 1104 and 1107. In this manner, the content feature vector (V4) is a feature vector that represents the presence or absence of each of the predefined number of classes (e.g., 3862 classes in one example) in the audio and/or video content of the subject video.

FIG. 12 shows a flowchart of an exemplary method for generating a vector space model of titles in accordance with aspects of the invention. Aspects of the method shown in FIG. 12 may be used in certain ones of the steps of the method shown in FIG. 5.

At step 1201, the system inputs videos tagged as misleading in the video sharing platform dataset. In embodiments, step 1201 comprises the module 435 inputting the videos in the misleading video corpus 441.

At step 1202, the system classifies each video by identifying a domain. In embodiments, step 1202 comprises the module 435 classifying each video from step 1201 (e.g., each video in the misleading video corpus 441) into each of the predefined domains D1, D2, . . . , Dn (also referred to as Domain #1, Domain #2, . . . , Domain #n at FIG. 6 and elsewhere in this description). In embodiments, the module 435 performs step 1202 using one or more classification tools and based on the predefined domains associated with the video corpus 440.

At step 1203, the system extracts the title of each video. In embodiments, step 1203 comprises the module 435 extracting the title of each video from step 1201 (e.g., each video in the misleading video corpus 441) based on metadata of each video and/or using NLP.

At step 1204, the system extracts content words in each title. In embodiments, step 1204 comprises the module 435 extracting content words from each title from step 1203. In embodiments, the module 435 extracts the content words by normalizing (e.g., removing punctuation) and removing stop words (e.g., functional content) of each title. The module 435 may use NLP tools to perform step 1204.

At step 1205, the system assigns weights to words in a vocabulary set. In embodiments, the vocabulary set is a set of all extracted content words in all the titles from each video from step 1201. In embodiments, the module 435 assigns relatively higher weights to words that are more indicative of misleading, and relatively lower weights to words that are less indicative of misleading.

At step 1206, the system generates a respective vector space model of titles for each domain of the predefined domains. In embodiments, the module 435 generates the respective vector space models based on the extracted content words from step 1204 and the weights from step 1205. In accordance with aspects of the invention, steps 1201-1206 are a method of generating the set of vector space models of titles VS1TD1, VS1TD2, . . . , VS1TDn (e.g., shown in FIG. 6) based on analyzing the titles of all the videos in the misleading video corpus 441. This set of vector space models of titles VS1TD1, VS1TD2, . . . , VS1TDn is represented by reference number 1207 in FIG. 12.

With continued reference to FIG. 12, at step 1208 the system inputs a subject video. In embodiments, step 1208 corresponds to step 510 of FIG. 5.

At step 1209, the system classifies the subject video into one of the predefined domains D1, D2, . . . , Dn (also referred to as Domain #1, Domain #2, . . . , Domain #n). In embodiments, the module 435 performs step 1209 using one or more classification tools and based on the predefined domains associated with the video corpus 440.

At step 1210, the system extracts the title of the subject video. In embodiments, step 1210 comprises the module 435 extracting the title of the subject video of step 1208 based on metadata of the subject video and/or using NLP. Step 1210 may optionally include the module 435 extracting content words in the title of the subject video, e.g., in a similar manner as described with respect to step 1204.

At step 1211, the system generates a vector space model of the title of the subject video. In embodiments, step 1211 comprises the module 435 generating the vector space model VST2 based on the extracted title from step 1210.

At step 1212, the system determines a semantic similarity between the vector space model VTS2 of step 1211 and the one of the vector space models of the set 1207 that has the same domain as determined at step 1209. For example, if the subject video is classified in Domain #n at step 1209, then at step 1212 the module 435 determines a semantic similarity between: (i) the vector space model for the title of the subject video (VST2) and (ii) the vector space model of titles of Domain #n (VS1TDn). In embodiments, step 1212 corresponds to step 525 of FIG. 5. In embodiments, the semantic similarity determined at step 1212 comprises a numeric semantic similarity score.

At step 1213, the module 435 determines whether the semantic similarity score determined at step 1212 is greater than a title threshold value. In the event the semantic similarity score determined at step 1212 is greater than the title threshold value, then at step 1214 the module 435 tags the title as misleading. In the event the semantic similarity score determined at step 1212 is not greater than the title threshold value, then at step 1215 the module 435 tags the title as non-misleading.

FIG. 13 shows a flowchart of an exemplary method for generating a vector space model of comments in accordance with aspects of the invention. Aspects of the method shown in FIG. 13 may be used in certain ones of the steps of the method shown in FIG. 5.

At step 1301, the system inputs videos tagged as misleading in the video sharing platform dataset. In embodiments, step 1301 comprises the module 435 inputting the videos in the misleading video corpus 441.

At step 1302, the system classifies each video by identifying a domain. In embodiments, step 1302 comprises the module 435 classifying each video from step 1301 (e.g., each video in the misleading video corpus 441) into one of the predefined domains D1, D2, ..., Dn (also referred to as Domain #1, Domain #2, ..., Domain #n). In embodiments, the module 435 performs step 1302 using one or more classification tools and based on the predefined domains associated with the video corpus 440.

At step 1303, the system extracts the comments of each video. In embodiments, step 1303 comprises the module 435 extracting the comments of each video from step 1301 (e.g., each video in the misleading video corpus 441) based on metadata of each video and/or using NLP.

At step 1303a, the system identifies comments that refer to a video as misleading. At step 1303b, the system identifies if the comments identified at step 1303a refer to the title and/or thumbnail of the video as being misleading. It is sometimes the case that a user posts a comment to a video that warns other users that the video is misleading. Aspects of the invention utilize steps 1303a and 1303b to account for such comments in the videos of the misleading video corpus 441. In embodiments, the module 435 performs steps 1303a and 1303b using text classification and entity-relation extraction tools.

At step 1304, the system extracts content words in each comment. In embodiments, step 1304 comprises the module 435 extracting content words from each comment from step 1303. In embodiments, the module 435 extracts the content words by normalizing (e.g., removing punctuation) and removing stop words (e.g., functional content) of each comment. The module 435 may use NLP tools to perform step 1304.

At step 1305, the system assigns weights to words in a vocabulary set. In embodiments, the vocabulary set is a set of all extracted content words in all the comments from each video from step 1301. In embodiments, the module 435 assigns relatively higher weights to words that are more indicative of being misleading, and relatively lower weights to words that are less indicative of being misleading.

At step 1306, the system generates a respective vector space model of comments for each domain of the predefined domains. In embodiments, the module 435 generates the respective vector space models of comments based on the extracted content words from step 1304 and the weights from step 1305. In accordance with aspects of the invention, steps 1301-1306 are a method of generating the set of vector space models of comments VS1CD1, VS1CD2, ..., VS1CDn (e.g., shown in FIG. 6) based on analyzing the comments of all the videos in the misleading video corpus 441. This set of vector space models of comments VS1CD1, VS1CD2, ..., VS1CDn is represented by reference number 1307 in FIG. 13.

With continued reference to FIG. 13, at step 1308 the system inputs a subject video. In embodiments, step 1308 corresponds to step 510 of FIG. 5.

At step 1309, the system classifies the subject video into one of the predefined domains D1, D2, ..., Dn (also referred to as Domain #1, Domain #2, ..., Domain #n). In embodiments, the module 435 performs step 1309 using one or more classification tools and based on the predefined domains associated with the video corpus 440.

At step 1310, the system extracts the comments of the subject video. In embodiments, step 1310 comprises the module 435 extracting the comments of the subject video of step 1308 based on metadata of the subject video and/or using NLP. Step 1310 may optionally include the module 435 extracting content words in the comments of the subject video, e.g., in a similar manner as described with respect to step 1304.

At step 1311, the system generates a vector space model of the comments of the subject video. In embodiments, step 1311 comprises the module 435 generating the vector space model VS2 based on the extracted comments from step 1311.

At step 1312, the system determines a semantic similarity between the vector space model VS2 of step 1311 and the one of the vector space models of the set 1307 that has the same domain as determined at step 1309. For example, if the subject video is classified in Domain #n at step 1309, then at step 1312 the module 435 determines a semantic similarity between: (i) the vector space model for the comments of the subject video (VS2) and (ii) the vector space model of comments of Domain #n (VS1CDn). In embodiments, step 1312 corresponds to step 530 of FIG. 5. In embodiments, the semantic similarity determined at step 1312 comprises a numeric semantic similarity score.

At step 1313, the module 435 determines whether the semantic similarity score determined at step 1312 is greater than a comment threshold value. In the event the semantic similarity score determined at step 1312 is greater than the comment threshold value, then at step 1314 the module 435 tags the comments as misleading. In the event the semantic similarity score determined at step 1312 is not greater than the comment threshold value, then at step 1315 the module 435 tags the comments as non-misleading.

FIG. 14 shows a flowchart of an exemplary method of classifying a subject video in accordance with aspects of the invention.

At step 1401, the system generates feature vectors for a subject video that is to be classified. In embodiments, the subject video is the subject video of step 510 of FIG. 5. In embodiments, the feature vectors of step 1401 are the feature vectors V1, V2, V3, V4 generated at step 515 of FIG. 5 in the manner as described at FIGS. 8-11.

At step 1402, the system computes semantic similarities between certain ones of the feature vectors of step 1401. In embodiments, step 1402 corresponds to step 520 of FIG. 5 in which the module determines similarity scores HT, HC, TC, DC, TD, HD.

At step 1403, the system assigns weights to the similarity scores HT, HC, TC, DC, TD, HD. In embodiments, as described at step 520 of FIG. 5, the module 435 applies respective weights to each of HT, HC, TC, DC, TD, HD. In embodiments, the weights are a relative measure of the respective components on a similarity score, and the system periodically adjusts one or more of the weights based on user feedback.

At step 1404, the module 435 computes a weighted sum of the weighted similarity scores from steps 1403. At step 1405, the module 435 compares the weighted sum of step 1404 to a threshold value. If the weighted sum is less than the threshold value, then the subject video is preliminarily classified as non-misleading and the process proceeds to step 1411. On the other hand, if the weighted sum is greater than the threshold value, then the subject video is preliminarily classified as misleading and the process proceeds to step 1415.

At step 1406, the system generates a vector space model of comments of the subject video. In embodiments, the subject video is the subject video of step 510 of FIG. 5. In embodiments, the vector space model of step 1406 is the vector space model VS2 generated at step 1311 of FIG. 13.

At step 1407, the system determines whether the comments are misleading. In embodiments, step 1407 corresponds to steps 1313-1315 of FIG. 13, in which the module 435 determines whether the comments are misleading by comparing the comments semantic similarity score (determined at step 1312) to a comment threshold value.

At step 1411, if the comments are non-misleading, as determined at step 1407, then the result is that both determinations (i.e., steps 1405, 1407) agree that the subject video is non-misleading, and at step 1412 the module 435 classifies the subject video as non-misleading. In embodiments, this classification of step 1412 is output to the user at step 540 of FIG. 5.

At step 1411, if the comments are misleading, as determined at step 1407, then the result is that the two determinations (i.e., steps 1405, 1407) do not agree whether the subject video is misleading. In this situation, at step 1413 the module 435 adjusts one or more of the weights that are assigned to the similarity scores HT, HC, TC, DC, TD, HD, and at step 1414 the module 435 returns to step 1404 to compute a new weighted sum using the adjusted weight(s) of step 1413. In embodiments, step 1413 includes adjusting the weights applied in to the title and/or thumbnail based on the findings of steps 1303a and 1303b of FIG. 13. For example, when the comments refer to the title and/or thumbnail as misleading, the system may use this to increase the weight applied to the title and/or thumbnail. In this manner, the module 435 iteratively repeats the process, adjusting one or more weights at each iteration, until the process converges on agreement between both determinations (i.e., steps 1405, 1407).

At step 1415, if the comments are misleading, as determined at step 1407, then the result is that both determinations (i.e., steps 1405, 1407) agree that the subject video is misleading, and at step 1416 the module 435 classifies the subject video as misleading. In embodiments, this classification of step 1416 is output to the user at step 540 of FIG. 5.

At step 1415, if the comments are non-misleading, as determined at step 1407, then the result is that the determinations (i.e., steps 1405, 1407) do not agree whether the subject video is misleading. In this situation, at step 1417 the module 435 adjusts one or more of the weights that are assigned to the similarity scores HT, HC, TC, DC, TD, HD, and at step 1418 the module 435 returns to step 1404 to compute a new weighted sum using the adjusted weight(s) of step 1417. In embodiments, step 1417 includes adjusting the weights applied in to the title and/or thumbnail based on the findings of steps 1303a and 1303b of FIG. 13. For example, when the comments refer to the title and/or thumbnail as misleading, the system may use this to increase the weight applied to the title and/or thumbnail. In this manner, the module 435 iteratively repeats the process, adjusting one or more weights at each iteration, until the process converges on agreement between all the determinations (i.e., steps 1405, 1407).

As should be understood from the description herein, aspects of the invention provide a method to automatically classify whether a video is a misleading based on: collecting a corpus of misleading videos that function as a training dataset; and analyzing the content of the video and its associated title, thumbnail, description and comments, or a subset thereof. In this method, from the corpus of misleading videos, for each supported video domain: a set of content words associated with the comment section is pre-determined; pre-determined weights are assigned to the content words; a vector-space model associated with the content words is generated and stored in a repository; and a pre-determined set of entities associated with the video are generated and stored in a repository. In this method, for a given video clip that is sought to be classified as a misleading or non-misleading: the video is classified into a domain supported by the corpus; the vector-space model of pre-determined content words extracted from the comment section is computed; the semantic similarity between the vector-space model and that stored in the repository associated with the domain is calculated; and if the semantic similarity is greater than a pre-determined threshold, the video is temporarily marked as a potential misleading. In this method, the title, thumbnail, description and content are extracted. For each of the aforementioned elements, the entities are identified, extracted, and mapped to that stored in the repository, and the corresponding feature vectors are calculated. In this method, the similarity scores based on the mutual distance of the feature vectors are computed and a weighted probability score is determined. In this method, if the probability score is less than a pre-determined threshold and if the video is not marked as a potentially misleading, it is classified as not misleading. If the probability score is beyond a pre-determined threshold and if the video is marked as a potentially misleading, the video is marked as a misleading and the user alerted. If the decisions do not converge, the weights are readjusted repeatedly until the algorithm converges.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
training, by a computing device, a model using a video corpus;
obtaining, by the computing device, a subject video from a content server;
generating, by the computing device, respective feature vectors of a title, a thumbnail, a description, and a content of the subject video;
determining, by the computing device, first semantic similarities between ones of the feature vectors;
determining, by the computing device, a second semantic similarity between the title of subject video and titles of videos in a misleading video corpus in a same domain as the subject video;
determining, by the computing device, a third semantic similarity between comments of the subject video and comments of videos in the misleading video corpus in the same domain as the subject video;
classifying, by the computing device, the subject video using the model and based on the first semantic similarities, the second semantic similarity, and the third semantic similarity; and
outputting, by the computing device, the classification of the subject video to a user.

2. The method of claim 1, further comprising analyzing a user profile of a user that posted the subject video, wherein the classifying the subject video is based on the analyzing user profile.

3. The method of claim 1, further comprising determining an average watch time of the subject video, wherein the classifying the subject video is based on the average watch time.

4. The method of claim 1, wherein the determining the first semantic similarities between ones of the feature vectors comprises:
determining a semantic similarity between the title and the thumbnail;
determining a semantic similarity between the title and the description;
determining a semantic similarity between the title and the content;
determining a semantic similarity between the thumbnail and the description;
determining a semantic similarity between the thumbnail and the content; and
determining a semantic similarity between the description and the content.

5. The method of claim 4, further comprising:
assigning respective weights to ones of the first semantic similarities;
receiving user feedback after the classifying the subject video; and
adjusting at least one of the respective weights based on the user feedback.

6. The method of claim 4, further comprising:
assigning respective weights to ones of the determined first semantic similarities;
determining a disagreement between (i) a classification based on the first semantic similarities and (ii) a classification based on the second semantic similarity or a classification based on the third semantic similarity; and
iteratively adjusting at least one of the respective weights based on the determined disagreement until there is agreement between the first semantic similarities, the second semantic similarity, and the third semantic similarity.

7. The method of claim 1, wherein:
the video corpus comprises videos classified using predefined classes; and
the generating the respective feature vectors comprises:
extracting entities from each of the title, the thumbnail, the description, and the content of the subject video; and
mapping the extracted entities to one or more of the predefined classes.

8. The method of claim 1, wherein the model is one of plural different models that each have different combinations of inputs, and further comprising selecting the model from the plural different models based on inputs available for the subject video.

9. The method of claim 8, further comprising:
classifying the subject video separately using each of the plural different models;
comparing results of the classifying using the plural different models; and
iteratively adjusting one or more weights of one or more parameters used in one or more of the plural different models based on the comparing until the results of the classifying using the plural different models all agree.

10. The method of claim 8, further comprising re-classifying the subject video at a later time using a different one of the plural different models.

11. The method of claim 1, further comprising:
updating the video corpus to include the subject video and the classification of the subject video; and
re-training the model using the updated video corpus.

12. The method of claim 1, wherein the classifying the subject video comprises classifying the subject video as one of: misleading; potentially misleading; and non-misleading.

13. A computer program product comprising one or more computer readable storage media having program instructions collectively stored on the one or more computer readable storage media, the program instructions executable to:
obtain a subject video from a content server;
generate respective feature vectors of a title, a thumbnail, a description, and a content of the subject video;
determine semantic similarities between ones of the feature vectors;
classify the subject video based on a weighted sum of the semantic similarities; and
output the classification of the subject video to a user.

14. The computer program product of claim 13, wherein the determining the semantic similarities between ones of the feature vectors comprises:
determining a semantic similarity between a title feature vector and a thumbnail feature vector;
determining a semantic similarity between the title feature vector and a description feature vector;
determining a semantic similarity between the title feature vector and a content feature vector;
determining a semantic similarity between the thumbnail feature vector and the description feature vector;
determining a semantic similarity between the thumbnail feature vector and the content feature vector; and
determining a semantic similarity between the description feature vector and the content feature vector.

15. The computer program product of claim 13, wherein:
the program instructions are executable to determine a title semantic similarity between the title of subject video and titles of videos in a misleading video corpus in a same domain as the subject video; and the classifying the subject video further based on the title semantic similarity.

16. The computer program product of claim 13, wherein:

the program instructions are executable to determine a comments semantic similarity between comments of subject video and comments of videos in a misleading video corpus in a same domain as the subject video;

the classifying the subject video further based on the comments semantic similarity; and the misleading video corpus is a subset of videos of a video corpus, wherein each video in the video corpus is tagged with one or more predefined classes, one or more predefined domains, and one or more predefined audio/visual features, and wherein each video in the misleading video corpus is additionally tagged as known misleading.

17. A system comprising:

a processor, one or more computer readable storage media, and program instructions collectively stored on the one or more computer readable storage media, the program instructions executable to:

obtain a subject video from a content server;

generate respective feature vectors of a title, a thumbnail, a description, and a content of the subject video;

determine semantic similarities between ones of the feature vectors;

classify the subject video based on a weighted sum of the semantic similarities; and output the classification of the subject video to a user.

18. The system of claim 17, wherein the determining the semantic similarities between ones of the feature vectors comprises:

determining a semantic similarity between a title feature vector and a thumbnail feature vector;

determining a semantic similarity between the title feature vector and a description feature vector;

determining a semantic similarity between the title feature vector and a content feature vector;

determining a semantic similarity between the thumbnail feature vector and the description feature vector;

determining a semantic similarity between the thumbnail feature vector and the content feature vector; and determining a semantic similarity between the description feature vector and the content feature vector.

19. The system of claim 17, wherein:

the program instructions are executable to determine a title semantic similarity between the title of subject video and titles of videos in a misleading video corpus in a same domain as the subject video; and the classifying the subject video further based on the title semantic similarity.

20. The system of claim 17, wherein:

the thumbnail of the subject video is a selectable by a user to play the subject video in a user interface;

the program instructions are executable to determine a comments semantic similarity between comments of subject video and comments of videos in a misleading video corpus in a same domain as the subject video; and the classifying the subject video further based on the comments semantic similarity.

* * * * *